United States Patent
Beerse et al.

(10) Patent No.: US 10,621,553 B2
(45) Date of Patent: *Apr. 14, 2020

(54) TEMPORAL PROMOTION OF CONTENT TO A PROJECT ACTIVITY

(71) Applicant: International Business Machines Corporation, Armonk, NY (US)

(72) Inventors: Chelsea C. Beerse, Cary, NC (US); Patrick J. O'Sullivan, Dublin (IE); Jeffrey B. Sloyer, Cary, NC (US); Carol S. Zimmet, Boxborough, MA (US)

(73) Assignee: International Business Machines Corporation, Armonk, NY (US)

(*) Notice: Subject to any disclaimer, the term of this patent is extended or adjusted under 35 U.S.C. 154(b) by 92 days.

This patent is subject to a terminal disclaimer.

(21) Appl. No.: 15/928,975

(22) Filed: Mar. 22, 2018

(65) Prior Publication Data

US 2018/0211225 A1     Jul. 26, 2018

Related U.S. Application Data

(63) Continuation of application No. 13/893,389, filed on May 14, 2013, now Pat. No. 9,946,992.

(51) Int. Cl.
   *G06Q 10/00* (2012.01)
   *G06Q 10/10* (2012.01)
   *G06Q 50/00* (2012.01)

(52) U.S. Cl.
   CPC ......... *G06Q 10/103* (2013.01); *G06Q 10/101* (2013.01); *G06Q 10/109* (2013.01); *G06Q 50/01* (2013.01)

(58) Field of Classification Search
   CPC ...... G06Q 10/10; G06Q 10/06; G06Q 10/101; G06Q 10/103; G06Q 10/109; G06Q 50/01
   See application file for complete search history.

(56) References Cited

U.S. PATENT DOCUMENTS 7,325,193 B2  1/2008  Edd et al.
7,386,797 B1  6/2008  Chatterjee et al.
(Continued)

OTHER PUBLICATIONS

United States Patent and Trademark Office, Office Action for U.S. Appl. No. 13/893,389, dated Sep. 21, 2016, pp. 1-22, Alexandria, VA, USA.

(Continued)

*Primary Examiner* — William S Brockington, III
(74) *Attorney, Agent, or Firm* — Robert C. Bunker (57) ABSTRACT

In response to a user request to promote user-level collaborative content from a first collaborative social interaction computing device to an application-level trackable project activity within a second project management computing device, the user-level collaborative content is transcoded to the application-level trackable project activity configured according to the transcoding with assigned application-level trackable project tasks to be performed by users within the second project management computing device. The users are synchronously allowed to collaboratively advance the application-level trackable project activity by performing the assigned application-level trackable project tasks within the second project management computing device while preventing application-level updates to the user-level collaborative content within the first collaborative social interaction computing device.

20 Claims, 4 Drawing Sheets

(56) References Cited

U.S. PATENT DOCUMENTS

| | | | |
|---|---|---|---|
| 8,095,873 B2 | 1/2012 | Kipp et al. | |
| 9,946,992 B2 | 4/2018 | Beerse | |
| 2003/0069854 A1 | 4/2003 | Hsu et al. | |
| 2005/0086661 A1* | 4/2005 | Monnie | G06F 9/526 |
| | | | 719/310 |
| 2006/0053196 A1* | 3/2006 | Spataro | G06Q 10/107 |
| | | | 709/205 |
| 2008/0209387 A1 | 8/2008 | Biehl et al. | |
| 2008/0276184 A1 | 11/2008 | Buffet et al. | |
| 2009/0192845 A1* | 7/2009 | Gudipaty | G06Q 10/10 |
| | | | 705/7.19 |
| 2009/0235182 A1 | 9/2009 | Kagawa et al. | |
| 2010/0114967 A1 | 5/2010 | Yaniv et al. | |
| 2010/0299334 A1 | 11/2010 | Waite et al. | |
| 2010/0299763 A1 | 11/2010 | Marcus et al. | |
| 2011/0093333 A1 | 4/2011 | Hjelm et al. | |
| 2012/0130954 A1 | 5/2012 | Hood | |
| 2012/0284176 A1 | 11/2012 | Svendsen et al. | |
| 2014/0344715 A1 | 11/2014 | Beerse et al. | |

OTHER PUBLICATIONS

United States Patent and Trademark Office, Office Action for U.S. Appl. No. 13/893,389, dated Jan. 26, 2017, pp. 1-18, Alexandria, VA, USA.

United States Patent and Trademark Office, Office Action for U.S. Appl. No. 13/893,389, dated May 24, 2017, pp. 1-24, Alexandria, VA, USA.

United States Patent and Trademark Office, Notice of Allowance for U.S. Appl. No. 13/893,389, dated Dec. 11, 2017, pp. 1-10, Alexandria, VA, USA.

Sangmi Lee, et al., Adapting Content for Mobile Devices in Heterogeneous Collaboration Environments, In Proceedings of the International Conference on Wireless Networks, 2003, pp. 211-217, CSREA Press, Las Vegas, NV, USA.

IBM: List of IBM Patents or Patent Applications Treated As Related (Appendix P), Sep. 26, 2019, pp. 1-2.

* cited by examiner

TEMPORAL PROMOTION OF CONTENT TO A PROJECT ACTIVITY

BACKGROUND

The present invention relates to content promotion between applications. More particularly, the present invention relates to temporal promotion of content to a project activity.

Users of computing devices may communicate and share ideas using social media technology. Social media technology also provides an online environment where people may collaborate to publish content and information. Examples of the published content and information may include wiki pages, blog posts, files, documents, and other forms of collaboratively published content.

SUMMARY

A method includes detecting, via a processor, a request from a user to promote an item of collaborative content from a first application associated with a collaborative social interaction system to a project activity within a project management system application; transcoding the item of collaborative content to the project activity within the project management system application; allowing users within a collaborative environment to collaboratively advance the project activity within the project management system application; and reverting the collaboratively-advanced project activity back to an updated item of collaborative content within the first application associated with the collaborative social interaction system.

A system includes a memory and a processor programmed to: detect a request from a user to promote an item of collaborative content within the memory from a first application associated with a collaborative social interaction system to a project activity within a project management system application; transcode the item of collaborative content to the project activity within the project management system application; allow users within a collaborative environment to collaboratively advance the project activity within the project management system application; and revert the collaboratively-advanced project activity back to an updated item of collaborative content within the memory within the first application associated with the collaborative social interaction system.

A computer program product includes a computer readable storage medium having computer readable program code embodied therewith, where the computer readable program code when executed on a computer causes the computer to: detect a request from a user to promote an item of collaborative content from a first application associated with a collaborative social interaction system to a project activity within a project management system application; transcode the item of collaborative content to the project activity within the project management system application; allow users within a collaborative environment to collaboratively advance the project activity within the project management system application; and revert the collaboratively-advanced project activity back to an updated item of collaborative content within the first application associated with the collaborative social interaction system.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides temporal promotion of content to a project activity. The promoted content may be, for example, collaborative content that is promoted (e.g., converted/transcoded) from collaborative content created within a collaborative social interaction system into an activity, such as a project activity within a separate and distinct project management system. The collaborative content may include content such as topics, items of content, wiki pages, blog posts, files, documents, and other forms of collaboratively published content. The activity may further be transcoded to include one or more configured tasks and/or sub-tasks that may be assigned to developers. The transcoded project activity may include a configured duration. The tasks and any sub-tasks may be tracked and/or managed against the configured duration within the project management system in association with a project or product development/maintenance cycle. The users may then collaboratively perform the assigned tasks and any sub-tasks associated with the project activity within the project management system. Notifications may be generated to remind the users to complete their respective tasks as the expiration of the configured duration of the project activity approaches. The "owner" of the original content may adjust the configured duration if and as appropriate. At expiration of the configured duration, the project activity may be converted/transcoded back into the collaborative content system/environment to update and synchronize the original collaborative content to incorporate/document the collaborative activities performed within the project management system.

As such, the present technology facilitates and manages synchronization of two disparate systems for collaborative content development and project management, respectively. Users may collaborate within each of the two systems independently to further enhance collaborative project development and/or maintenance. When a change is made in one system, the other system may be automatically updated to maintain synchronization between the separate collaborative content and project activities. Accordingly, the present technology provides a cross-platform integration of technologies that may be utilized to improve both user collaboration and project/task management. By use of the present technology, social user communities, such as project development teams, may collaboratively and flexibly create a topic or item of content within a collaborative social interaction system, such as a social media or social networking platform/system, to refine development goals and responsibilities. All or a portion of the collaborative content that represents the development goals and responsibilities may be transcoded into one or more assigned tasks/sub-tasks within the project management system to help the responsible individuals carry out the respective assigned goals and responsibilities. The resulting activity status may be transcoded back into the collaborative social interaction system at any time to allow further collaboration, reporting, and other functions.

An example of where the present technology may be applied includes use of the present technology by a project development team. A user that is a member of the project development team may be working on a new release of a product and may be trying to find business rules and use cases related to implementation of a new method and/or new functionality. The present technology allows the owner of a community to temporarily (e.g., for a time period) promote content to another media format (e.g., an activity associated with a project in a project management system) for collaboration or use. The present technology promotes a piece of content to another format/system that allows the user to more easily interact with and use the content or tools. Once the content is no longer being processed in the other format/system, the activity may be returned to the source as updated content and may be archived for use at a later time. The conversion or transcoding may be repeated as appropriate for a given implementation or situation to provide a fluid bi-directional integration of technologies that may improve both user collaboration and project/task management. Further, to support modifications to development schedules, a configured time period or duration of content promotion to one or more activities may be modified by the owner of the community and/or activity, as appropriate for the given implementation, to accommodate schedule changes.

As another example implementation within a user interface of a collaborative social interaction system, a group of users/participants may have a collaborative social interaction community established to represent an upcoming release of the product they are working on together. Within this collaborative social interaction community, a user/participant may have created several items of content that represent different phases in the project development life cycle. The owner of the collaborative social interaction community may want to track these several items of content as subtasks for a development cycle for the upcoming release.

The present subject matter allows the owner to "right click" with a mouse or other pointing device on the development item of content within a user interface of the collaborative social interaction community and a pop-up menu with options related to the item of content may be presented to the user. One option may be titled "Promote Content to an Activity." By selecting this option, the owner may be presented with an activity promotion dialog box and may input information about the activity, such as activity promotion parameters, to be created from the development item of content.

An activity promotion parameter the owner may input may be, for example, an end date or duration of the activity. Other activity promotion parameters are possible and all such parameters are considered to be within the scope of the present technology. The activity promotion dialog box may also present a "Promote" button to the owner to cause input of the various activity promotion parameters for generation of an activity within a separate project management system (e.g., distinct from the collaborative social interaction system/community).

Once the owner clicks the "Promote" button, the original piece of content in the collaborative social interaction community may be locked to prevent modifications during the promoted activity time period, and the activity may be created for the development phase within the separate project management system. Members of the development team and the owner of the collaborative social interaction community may now use the activity created within the project management system to track and monitor sub-tasks related to the development phase of the new release of the product.

When the end date of the promoted activity time period approaches, such as one (1) week or other time period prior to expiration of the promoted activity time period, the present technology may notify members of the activity within the project management system that the activity is ending soon and to finalize their activity updates before the activity ends. Once the activity ends within the project management system, the activity becomes locked within the project management system and the content in the activity is moved back to the original source in the collaborative social interaction community. At this time, the temporary activity that was created within the project management system may be removed and deleted from the project management system.

As such, the present technology temporally promotes community content to project activities, and updates the community content in response to expiration of the promoted activity time period. The present technology also manages removal of the activity from the project development system.

It should be noted that, as an option, the owner of the activity within the project management system may also provide members of the collaborative social interaction community with write access to the original content in the collaborative social interaction community. However, if these authorized members do not update the original content, the content may remain locked. Resynchronization of the original content with any changes may be performed when the temporal activity is completed, such that the synchronization occurs at the completion of the temporal activity rather than during the time period of the temporal activity.

Accordingly, by use of the subject matter described herein, a business and/or development team may track deliverables and progress of multiple sub-tasks in a more visible and straight forward manner. This improved visibility of collaborative interactions may benefit the developer through improved efficiency and may benefit management by improving project management and deliverable tracking. For the developer working on adding functionality to a project/product, the developer's management may determine detailed status of a particular task that was created within a collaborative content development system by reviewing a current status of the ongoing project activities of the project that was created within the project management system from the collaborative content. From the management perspective, management may plan more effectively by knowing how far each developer has progressed in terms of completion of their respective set of subtasks for their unit of work.

It should be noted that conception of the present subject matter resulted from recognition of certain limitations associated with conventional collaborative content technology (e.g., social media environments and systems). For example, it was observed that product or other project development teams may create collaborative content within a collaborative content system (e.g., wikis, blog posts, files, documents, and other forms of collaboratively published content) related to a product or project that is being managed. It was determined that, in view of this observation, project development efficiency may be improved by programmatically converting/promoting that collaboratively-created content to a project activity within a project management system so that the project activity may be managed as part of project management operations. However, it was determined that functionality does not exist within conventional collaborative content technology to promote collaboratively-created content to a project activity within a separate project management system. It was further determined that functionality does not exist within conventional project management technology to convert project activities back to collaborative content when a project activity is completed. The present subject matter improves collaborative interaction and project management by providing for temporal promotion of content to a project activity, as described above and in more detail below. As such, improved project operations, such as product development, product management, and related activities, may be obtained through use of the present technology.

The temporal promotion of content to a project activity described herein may be performed in real time to allow prompt promotion of collaborative content from a collaborative content system to project activities within a project management system, and to allow prompt conversion of project activities within the project management system back to collaborative content collaborative content system. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
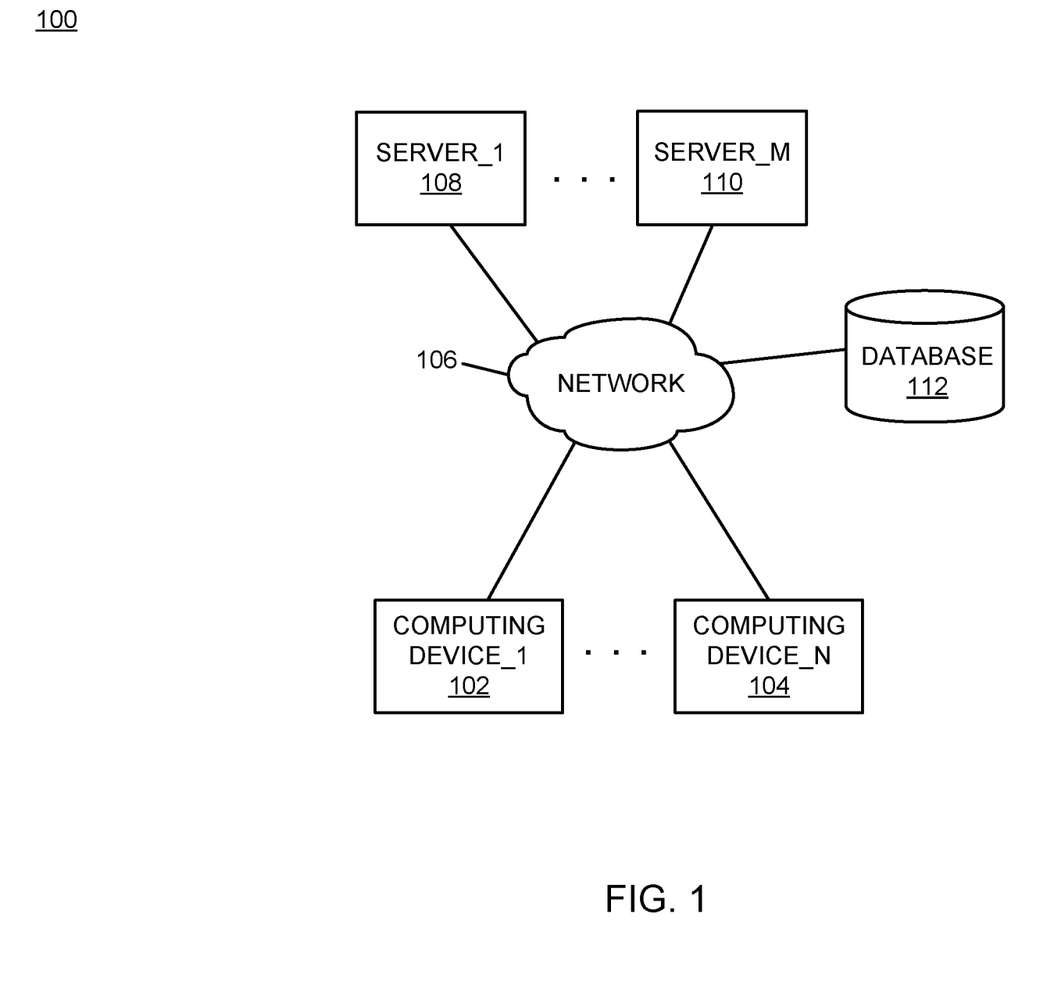
FIG. 1 is a block diagram of an example of an implementation of a system for temporal promotion of content to a project activity according to an embodiment of the present subject matter.

FIG. 1 is a block diagram of an example of an implementation of a system 100 for temporal promotion of content to a project activity. A computing device_1 102 through a computing device_N 104 communicate via a network 106 with several other devices. The other devices include a server_1 108 through a server_M 110, and a database 112.

As will be described in more detail below in association with FIG. 2 through FIG. 4, the computing device_1 102 through the computing device_N 104 and the server_1 108 through the server_M 110 may each provide temporal promotion of content to a project activity. The temporal promotion of content to a project activity is based upon content selections within collaborative social interaction communities and promotion of that content to traceable activities within one or more separate project management systems. As such, the present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

The database 112 may include a relational database, an object database, or any other storage type of device. As such, the database 112 may be implemented as appropriate for a given implementation. The database 112 may be utilized to store archived, retrieved, and collaborative social interaction system/community information, as well as transcoded project activities that have been promoted by a community owner for tracking within a project management system.

Figure 2:
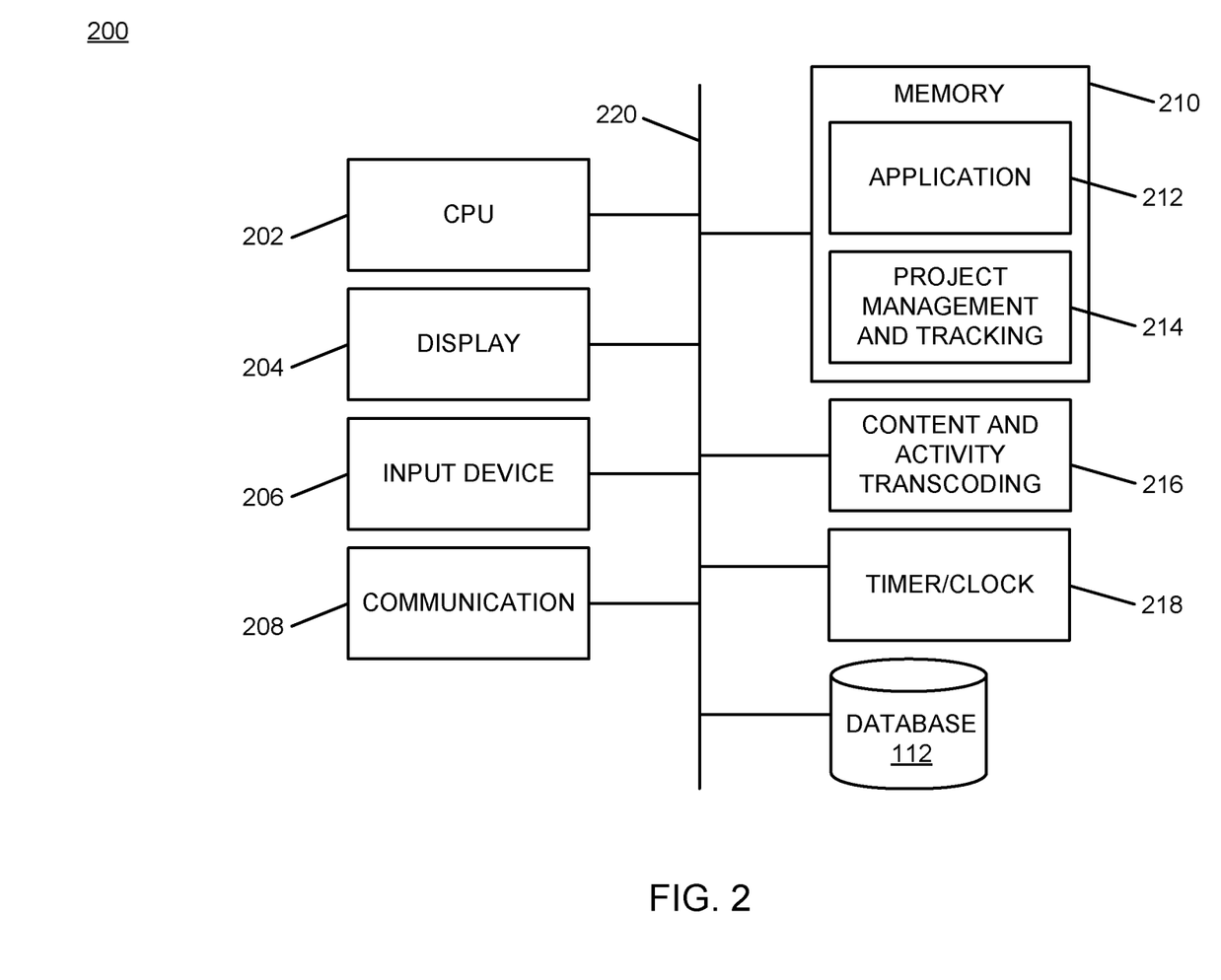
FIG. 2 is a block diagram of an example of an implementation of a core processing module capable of performing temporal promotion of content to a project activity according to an embodiment of the present subject matter.

FIG. 2 is a block diagram of an example of an implementation of a core processing module 200 capable of performing temporal promotion of content to a project activity. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of temporal promotion of content to a project activity in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application area 212 that provides storage and execution space for one or more community interaction applications (e.g., web browsers), and one or more project management system applications. The memory 210 also includes a project management and tracking storage area 214 that stores information associated with one or more projects that are being managed and tracked by the core processing module 200, such as calendars, tasks, developers/resources assigned to tasks, and other related project information.

As will be described in more detail below, information stored within the project management and tracking storage area 214 may be used to evaluate content from collaborative social interaction systems/communities that has been promoted to one or more project activities within a project management system/application. As such, developers and managers may utilize the core processing module 200 in association with the respective devices of the system 100 to perform the respective project activities and manage their respective scheduling obligations using the information stored within the project management and tracking storage area 214.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A content and activity transcoding module 216 is also illustrated. The content and activity transcoding module 216 provides forward transcoding of collaborative social interaction community content to project activities, and provides inverse transcoding of project activities to collaborative social interaction community content for the core processing module 200, as described above and in more detail below. The content and activity transcoding module 216 may also implement the respective web interface-based application and project management system interfaces, as appropriate for the given implementation. The content and activity transcoding module 216 may also interface with both the collaborative social interaction community system and the project management system to manage temporal promotion of the community content to the project activities, including developer reminders and other activities. The content and activity transcoding module 216 may also interface with both the collaborative social interaction community system and the project management system to manage reversion of the project activities back to the collaborative social interaction community content in response to expiration of the time period(s) designated for promotion of the content to the respective project activities. The content and activity transcoding module 216 implements the automated temporal promotion of content to a project activity of the core processing module 200.

It should also be noted that the content and activity transcoding module 216 may form a portion of other circuitry described without departure from the scope of the present subject matter. Further, the content and activity transcoding module 216 may alternatively be implemented as an application stored within the memory 210. In such an implementation, the content and activity transcoding module 216 may include instructions executed by the CPU 202 for performing the functionality described herein. The CPU 202 may execute these instructions to provide the processing capabilities described above and in more detail below for the core processing module 200. The content and activity transcoding module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as temporal information associated with project activity promotion of collaborative social interaction community content, as described above and in more detail below. As such, the content and activity transcoding module 216 utilizes information derived from the timer/clock module 218 for information processing activities, such as the temporal promotion of content to a project activity.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the content and activity transcoding module 216, the timer/clock module 218, and the database 112 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
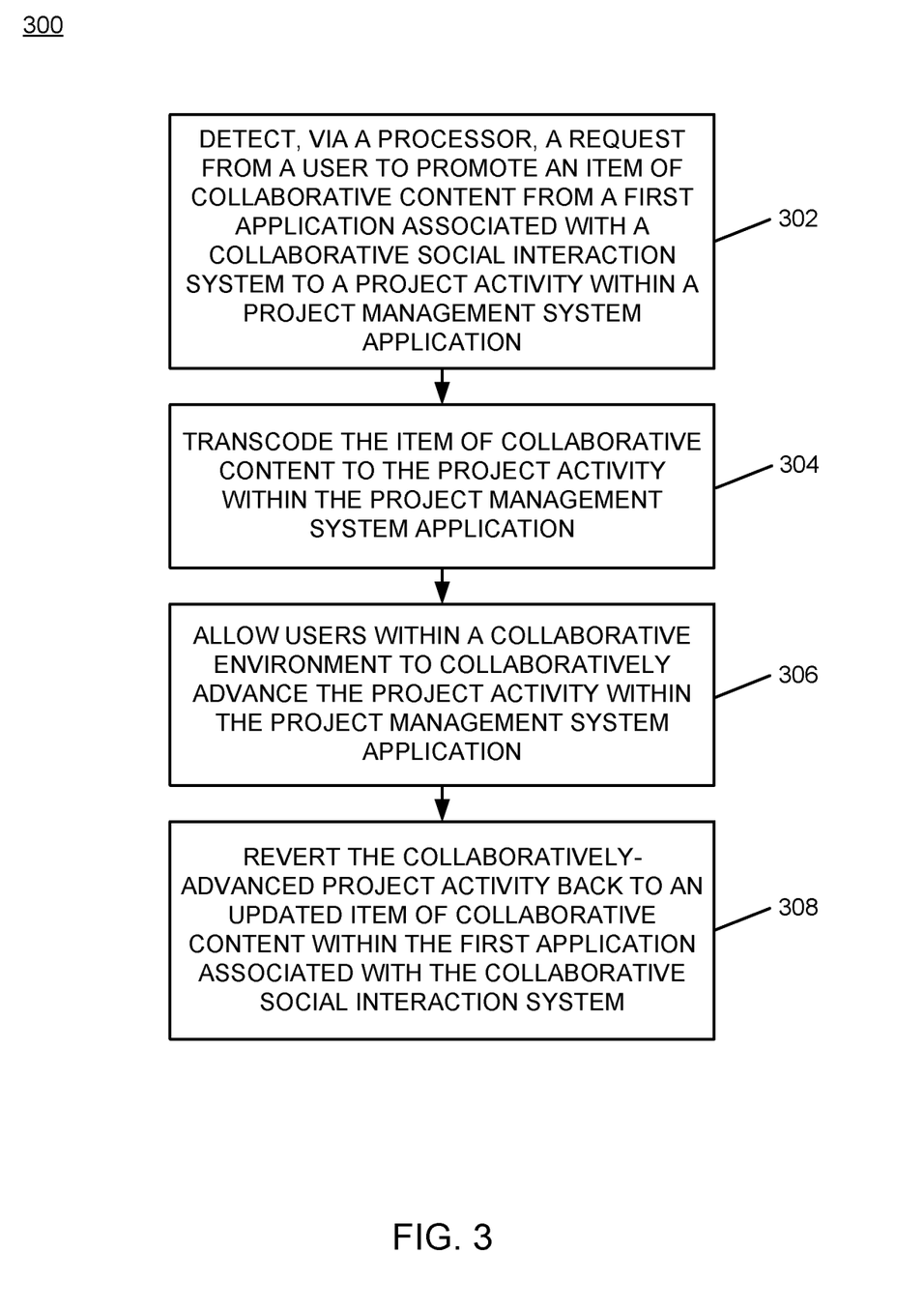
FIG. 3 is a flow chart of an example of an implementation of a process for temporal promotion of content to a project activity according to an embodiment of the present subject matter.
Figure 4:
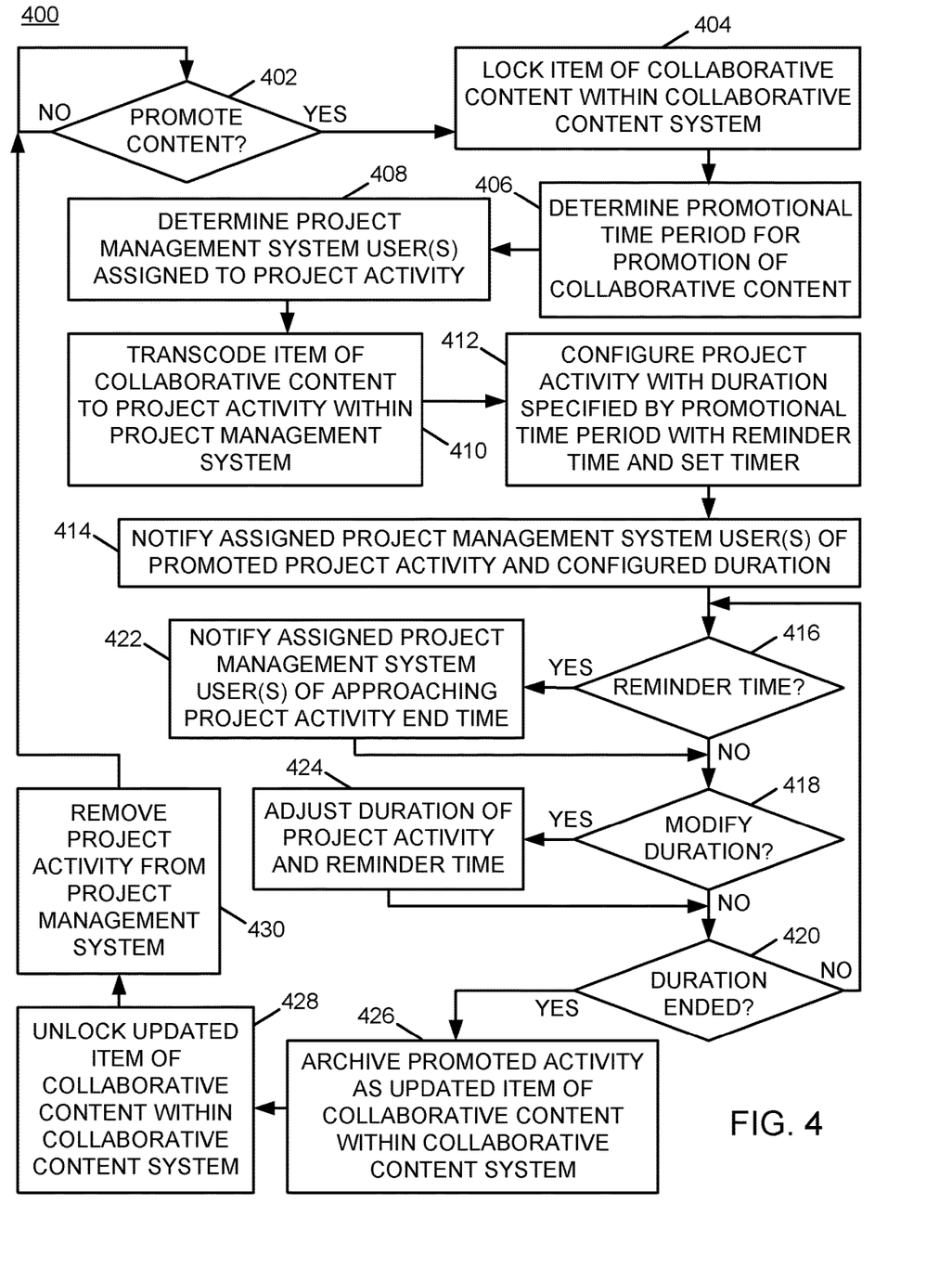
FIG. 4 is a flow chart of an example of an implementation of a process for temporal promotion of content to a project activity according to an embodiment of the present subject matter.

FIG. 3 through FIG. 4 described below represent example processes that may be executed by devices, such as the core processing module 200, to perform the automated temporal promotion of content to a project activity associated with the present subject matter. Many other variations on the example processes are possible and all are considered within the scope of the present subject matter. The example processes may be performed by modules, such as the content and activity transcoding module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for temporal promotion of content to a project activity. At block 302, the process 300 detects, via a processor, a request from a user to promote an item of collaborative content from a first application associated with a collaborative social interaction system to a project activity within a project management system application. At block 304, the process 300 transcodes the item of collaborative content to the project activity within the project management system application. At block 306, the process 300 allows users within a collaborative environment to collaboratively advance the project activity within the project management system application. At block 308, the process 300 reverts the collaboratively-advanced project activity back to an updated item of collaborative content within the first application associated with the collaborative social interaction system.

FIG. 4 is a flow chart of an example of an implementation of a process 400 for temporal promotion of content to a project activity. At decision point 402, the process 400 makes a determination as to whether a request from a user to promote an item of collaborative content from a first application associated with a collaborative social interaction system to a project activity within a second application of a project management system has been detected. Detecting the request from the user to promote the item of collaborative content may include, for example, detecting a "right click" of a mouse input device over a portion of collaborative content displayed within a user interface of the first application associated with the collaborative social interaction system, which may result in the display of a pop-up menu associated with content promotion, followed by the detection of a selection of a menu pop-up menu option that indicates the request to promote the item of collaborative content to the project activity. The menu option may be, for example, a pop-up menu option such as a "Promote Content to an Activity" pop-up menu option.

In response to determining that a request to promote the item of collaborative content from a first application associated with a collaborative social interaction system to a project activity within a second application of a project management system has been detected, the process 400 locks the item of collaborative content within the collaborative content system at block 404. The item of content may remain locked to prevent user modification during the project activity.

At block 406, the process 400 determines a promotional time period or duration for promotion of the collaborative content to the project activity. Determining the promotional time period or duration for promotion of the collaborative content to the project activity may include prompting the user to specify the respective time period or duration. Alternatively, the pop-up menuing system may be configured to present promotion options (e.g., one week, a configured number of days, one month, etc.), and the detected request to promote the item of content may include the designated time period or duration. A reminder time may also be determined and/or specified as described above, that may be usable to remind developers when the project activity is nearing its specified end. The reminder time may be, for example, one day before expiration of the time period, one week before expiration of the time period, or other time/interval relative to the end of the project activity as appropriate for a given implementation.

At block 408, the process 400 determines one or more specified project management system users that are assigned to the project activity. As described above, the project activity may include one or more tasks, each with one or more sub-tasks, as appropriate for a given implementation. As such, the determination of one or more specified project management system users that are assigned to the project activity may include assignment of individuals to each task/sub-task, again as appropriate for a given implementation.

At block 410, the process 400 transcodes the item of collaborative content to the project activity within the project management system, including any appropriate tasks and/or sub-tasks as described above. At block 412, the process 400 configures the project activity with a duration specified by the promotional time period or duration, with the reminder time, and sets a timer, such as a timer associated with the timer/clock module 218. At block 414, the process 400 notifies the assigned project management system user(s) of the promoted project activity and the configured duration of the project activity.

The process 400 then begins an iterative cycle of several determinations associated with the promoted project activity. At decision point 416, the process 400 makes a determination as to whether the configured reminder time has arrived. In response to determining that the configured reminder time has not arrived, the process 400 makes a determination at decision point 418 as to whether a request to modify the configured duration of the project activity has been detected. As described above, an owner of the content within the collaborative social interaction system, or another individual with appropriate authorization, may be allowed to change/modify the configured duration. In response to determining that a request to modify the configured duration of the project activity has not been detected, the process 400 makes a determination at decision point 420 as to whether the configured duration of the project activity has expired (e.g., that the configured end time has arrived). In response to determining that the duration of the project activity has not expired, the process 400 returns to decision point 416 and iterates as described above.

Returning to the description of decision point 416, in response to determining that the configured reminder time has arrived, the process 400 notifies the assigned project management system user(s) of the configured approaching project activity end time. As such, in response to determining that the configured reminder time has arrived, the process 400 notifies members of the project activity of the end date of the project activity at block 422 so that they can finalize their project activity content updates before the project activity ends. The process 400 returns to decision point 418 and iterates as described above.

Returning to the description of decision point 418, in response to determining that a request to modify the configured duration of the project activity has been detected, the process 400 adjusts the configured duration of the project activity and the configured reminder time at block 424. The process 400 returns to decision point 420 and iterates as described above.

Returning to the description of decision point 420, in response to determining that the configured duration of the project activity has expired, the process 400 begins processing to revert the collaboratively-advanced project activity back to an updated item of collaborative content within the first application associated with the collaborative social interaction system. At block 426, the process 400 programmatically archives the promoted project activity as an updated item of collaborative content within the first application associated with the collaborative social interaction system. At block 428, the process 400 unlocks the updated item of collaborative content within the collaborative social interaction system. At block 430, the process 400 removes the project activity from the project management system application in response to reverting the collaboratively-advanced project activity back to the updated item of collaborative content within the first application associated with the collaborative social interaction system. The process 400 returns to decision point 402 and iterates as described above. It should be noted that the process 400 may be re-entrant, in that a content owner may issue a new request to re-promote the updated item of collaborative content to a new project activity, and such a request may re-invoke the process 400 to re-promote the updated item of collaborative content to the new project activity.

As such, the process 400 transcodes one or more items of collaborative content within a collaborative social interaction system to promote the content to a project activity within a project management system application. The process 400 allows users within the collaborative environment to collaboratively advance the project activity within the project management system application to advance the collaboration initiated within the first application associated with the collaborative social interaction system. The process 400 reverts the collaboratively-advanced project activity back to an updated item of collaborative content usable in association with the first application associated with the collaborative social interaction system.

As described above in association with FIG. 1 through FIG. 4, the example systems and processes provide temporal promotion of content to a project activity. Many other variations and additional activities associated with temporal promotion of content to a project activity are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   by a processor within a hierarchical collaborative computing environment that provides bi-directional integration and synchronized operations between a first collaborative social interaction computing device and a second project management computing device as a set:
   transcoding, in response to a user request to promote user-level collaborative content from the first collaborative social interaction computing device to an application-level trackable project activity within the second project management computing device, the user-level collaborative content to the application-level trackable project activity configured according to the transcoding with assigned application-level trackable project tasks to be performed by users within the second project management computing device; and synchronously allowing the users within the hierarchical collaborative computing environment to collaboratively advance the application-level trackable project activity by performing the assigned application-level trackable project tasks within the second project management computing device while preventing application-level updates to the user-level collaborative content within the first collaborative social interaction computing device.

2. The method of claim 1, further comprising the processor:

reverting the collaboratively-advanced application-level trackable project activity from the second project management computing device back to updated user-level collaborative content within the first collaborative social interaction computing device; and removing the application-level trackable project activity from the second proj ect management computing device in response to reverting the collaboratively-advanced application-level trackable project activity from the second project management computing device back to the updated user-level collaborative content within the first collaborative social interaction computing device.

3. The method of claim 1, further comprising the processor:

programmatically archiving the collaboratively-advanced application-level trackable project activity as updated user-level collaborative content within the first collaborative social interaction computing device; and iteratively transcoding the archived collaboratively-advanced application-level trackable project activity of the updated user-level collaborative content back to the second project management computing device as a new application-level trackable project activity in response to detecting a second user request to re-promote the updated user-level collaborative content to the new application-level trackable project activity within the second project management computing device.

4. The method of claim 1, further comprising the processor:

detecting, as further configured according to the transcoding, a configured duration of a promotion of the user-level collaborative content to the application-level trackable project activity;

configuring, as application-level project activity tracking data, a defined duration of the application-level trackable project activity within the second project management computing device and a duration of the preventing of the application-level updates to the user-level collaborative content within the first collaborative social interaction computing device based upon the configured duration of the promotion of the user-level collaborative content to the application-level trackable project activity; and notifying, within the hierarchical collaborative computing environment, members of the application-level trackable project activity of an end date of the application-level trackable project activity and to finalize project activity content updates before the application-level trackable project activity ends in response to determining that a configured reminder time has arrived.

5. The method of claim 1, where the processor synchronously allowing the users within the hierarchical collaborative computing environment to collaboratively advance the application-level trackable project activity by performing the assigned application-level trackable project tasks within the second project management computing device while preventing the application-level updates to the user-level collaborative content within the first collaborative social interaction computing device comprises the processor:

locking the user-level collaborative content to prevent user content updates within the first collaborative social interaction computing device during a configured duration of the application-level trackable project activity within the second project management computing device; and unlocking, in response to updating the user-level collaborative content as part of reverting the collaboratively-advanced application-level trackable project activity from the second project management computing device back to the first collaborative social interaction computing device, the updated user-level collaborative content to allow the user content updates within the first collaborative social interaction computing device.

6. The method of claim 1, further comprising the processor detecting the user request from the user to promote the user-level collaborative content, comprising the processor:

detecting a right click of a mouse input device over a portion of the user-level collaborative content displayed within a user interface of the first collaborative social interaction computing device;

displaying a pop-up menu associated with content promotion; and detecting a user selection of a pop-up menu option that indicates the user request to promote the portion of the user-level collaborative content to the application-level trackable project activity within the second project management computing device.

7. The method of claim 1, where the transcoding further comprises configuring application-level project activity tracking data by which to track the application-level trackable project activity, and further comprising the processor:

detecting a third user request to modify a configured duration of the application-level trackable project activity within the second project management computing device; and modifying, within the application-level project activity tracking data, each of an expiration time of the application-level trackable project activity within the second project management computing device, a duration of the preventing of the application-level updates to the user-level collaborative content within the first collaborative social interaction computing device, and a reminder time of the application-level trackable project activity in response to the detected user request to modify the configured duration of the application-level trackable project activity.

8. A system, comprising:

a memory; and a processor within a hierarchical collaborative computing environment that provides bi-directional integration and synchronized operations between a first collaborative social interaction computing device and a second project management computing device as a set, where the processor is programmed to:

transcode, in response to a user request to promote user-level collaborative content within the memory from the first collaborative social interaction computing device to an application-level trackable project activity within the second project management computing device, the user-level collaborative content to the application-level trackable project activity configured according to the transcoding with assigned application-level trackable project tasks to be performed by users within the second project management computing device; and synchronously allow the users within the hierarchical collaborative computing environment to collaboratively advance the application-level trackable project activity by performing the assigned application-level trackable project tasks within the second project management computing device while preventing application-level updates to the user-level collaborative content within the first collaborative social interaction computing device.

9. The system of claim 8, where the processor is further programmed to:

revert the collaboratively-advanced application-level trackable project activity from the second project management computing device back to updated user-level collaborative content within the memory within the first collaborative social interaction computing device; and remove the application-level trackable project activity from the second project management computing device in response to reverting the collaboratively-advanced application-level trackable project activity from the second project management computing device back to the updated user-level collaborative content within the memory within the first collaborative social interaction computing device.

10. The system of claim 8, where the processor is further programmed to:

archive the collaboratively-advanced application-level trackable project activity as updated user-level collaborative content within the memory within the first collaborative social interaction computing device; and iteratively transcode the archived collaboratively-advanced application-level trackable project activity of the updated user-level collaborative content back to the second project management computing device as a new application-level trackable project activity in response to detecting a second user request to re-promote the updated user-level collaborative content to the new application-level trackable project activity within the second project management computing device.

11. The system of claim 8, where the processor is further programmed to:

detect, as further configured according to the transcoding, a configured duration of a promotion of the user-level collaborative content to the application-level trackable project activity;

configure, as application-level project activity tracking data, a defined duration of the application-level trackable project activity within the second project management computing device and a duration of the preventing of the application-level updates to the user-level collaborative content within the first collaborative social interaction computing device based upon the configured duration of the promotion of the user-level collaborative content to the application-level trackable project activity; and notify, within the hierarchical collaborative computing environment, members of the application-level trackable project activity of an end date of the application-level trackable project activity and to finalize project activity content updates before the application-level trackable project activity ends in response to determining that a configured reminder time has arrived.

12. The system of claim 8, where, in being programmed to synchronously allow the users within the hierarchical collaborative computing environment to collaboratively advance the application-level trackable project activity by performing the assigned application-level trackable project tasks within the second project management computing device while preventing the application-level updates to the user-level collaborative content within the first collaborative social interaction computing device, the processor is programmed to:

lock the user-level collaborative content to prevent user content updates within the memory within the first collaborative social interaction computing device during a configured duration of the application-level trackable project activity within the second project management computing device; and unlock, in response to updating the user-level collaborative content as part of reverting the collaboratively-advanced application-level trackable project activity from the second project management computing device back to the first collaborative social interaction computing device, the updated user-level collaborative content to allow the user content updates within the memory within the first collaborative social interaction computing device.

13. The system of claim 8, where the transcoding further comprises configuring application-level project activity tracking data by which to track the application-level trackable project activity, and further comprising an input device, and where the processor is further programmed to:

detect a third user request, via the input device, to modify a configured duration of the application-level trackable project activity within the second project management computing device; and modify, within the application-level project activity tracking data, each of an expiration time of the application-level trackable project activity within the second project management computing device, a duration of the preventing of the application-level updates to the user-level collaborative content within the first collaborative social interaction computing device, and a reminder time of the application-level trackable project activity in response to the detected user request, via the input device, to modify the configured duration of the application-level trackable project activity.

14. A computer program product, comprising:

a computer readable storage medium having computer readable program code embodied therewith, where the computer readable program code when executed on a computer, within a hierarchical collaborative computing environment that provides bi-directional integration and synchronized operations between a first collaborative social interaction computing device and a second project management computing device as a set, causes the computer to:

transcode, in response to a user request to promote user-level collaborative content from the first collaborative social interaction computing device to an application-level trackable project activity within the second project management computing device, the user-level collaborative content to the application-level trackable project activity configured according to the transcoding with assigned application-level trackable project tasks to be performed by users within the second project management computing device; and synchronously allow the users within the hierarchical collaborative computing environment to collaboratively advance the application-level trackable project activity by performing the assigned application-level trackable project tasks within the second project management computing device while preventing application-level updates to the user-level collaborative content within the first collaborative social interaction computing device.

15. The computer program product of claim 14, where the computer readable program code when executed on the computer further causes the computer to:

revert the collaboratively-advanced application-level trackable project activity from the second project management computing device back to updated user-level collaborative content within the first collaborative social interaction computing device; and remove the application-level trackable project activity from the second project management computing device in response to reverting the collaboratively-advanced application-level trackable project activity from the second project management computing device back to the updated user-level collaborative content within the first collaborative social interaction computing device.

16. The computer program product of claim 14, where the computer readable program code when executed on the computer further causes the computer to:

programmatically archive the collaboratively-advanced application-level trackable project activity as updated user-level collaborative content within the first collaborative social interaction computing device; and iteratively transcode the archived collaboratively-advanced application-level trackable project activity of the updated user-level collaborative content back to the second project management computing device as a new application-level trackable project activity in response to detecting a second user request to re-promote the updated user-level collaborative content to the new application-level trackable project activity within the second project management computing device.

17. The computer program product of claim 14, where the computer readable program code when executed on the computer further causes the computer to:

detect, as further configured according to the transcoding, a configured duration of a promotion of the user-level collaborative content to the application-level trackable project activity;

configure, as application-level project activity tracking data, a defined duration of the application-level trackable project activity within the second project management computing device and a duration of the preventing of the application-level updates to the user-level collaborative content within the first collaborative social interaction computing device based upon the configured duration of the promotion of the user-level collaborative content to the application-level trackable project activity; and notify, within the hierarchical collaborative computing environment, members of the application-level trackable project activity of an end date of the application-level trackable project activity and to finalize project activity content updates before the application-level trackable project activity ends in response to determining that a configured reminder time has arrived.

18. The computer program product of claim 14, where, in causing the computer to synchronously allow the users within the hierarchical collaborative computing environment to collaboratively advance the application-level trackable project activity by performing the assigned application-level trackable project tasks within the second project management computing device while preventing the application-level updates to the user-level collaborative content within the first collaborative social interaction computing device, the computer readable program code when executed on the computer causes the computer to:

lock the user-level collaborative content to prevent user content updates within the first collaborative social interaction computing device during a configured duration of the application-level trackable project activity within the second project management computing device; and unlock, in response to updating the user-level collaborative content as part of reverting the collaboratively-advanced application-level trackable project activity from the second project management computing device back to the first collaborative social interaction computing device, the updated user-level collaborative content to allow the user content updates within the first collaborative social interaction computing device.

19. The computer program product of claim 14, where the computer readable program code when executed on the computer further causes the computer to detect the user request from the user to promote the user-level collaborative content, comprising causing the computer to:

detect a right click of a mouse input device over a portion of the user-level collaborative content displayed within a user interface of the first collaborative social interaction computing device;

display a pop-up menu associated with content promotion; and detect a user selection of a pop-up menu option that indicates the user request to promote the portion of the user-level collaborative content to the application-level trackable project activity within the second project management computing device.

20. The computer program product of claim 14, where the transcoding further comprises configuring application-level project activity tracking data by which to track the application-level trackable project activity, and where the computer readable program code when executed on the computer further causes the computer to:

detect a third user request to modify a configured duration of the application-level trackable project activity within the second project management computing device; and modify, within the application-level project activity tracking data, each of an expiration time of the application-level trackable project activity within the second project management computing device, a duration of the preventing of the application-level updates to the user-level collaborative content within the first collaborative social interaction computing device, and a reminder time of the application-level trackable project activity in response to the detected user request to modify the configured duration of the application-level trackable project activity.

\* \* \* \* \*